(12) United States Patent
Inoue et al.

(10) Patent No.: US 7,976,887 B2
(45) Date of Patent: Jul. 12, 2011

(54) METHOD OF EXTRACTING VOLATILE COMPONENT FROM TASTY MATERIAL, THE VOLATILE COMPONENT AND FOODS AND DRINKS CONTAINING THE VOLATILE COMPONENT

(75) Inventors: Takashi Inoue, Aichi (JP); Yumiko Aoyama, Aichi (JP); Michiya Hayashi, Gifu (JP); Keiichi Narita, Niwa-gun Aichi (JP)

(73) Assignee: Pokka Corporation (JP)

( * ) Notice: Subject to any disclaimer, the term of this patent is extended or adjusted under 35 U.S.C. 154(b) by 698 days.

(21) Appl. No.: 10/573,322

(22) PCT Filed: Nov. 2, 2004

(86) PCT No.: PCT/JP2004/016275
§ 371 (c)(1),
(2), (4) Date: Mar. 24, 2006

(87) PCT Pub. No.: WO2005/044014
PCT Pub. Date: May 19, 2005

(65) Prior Publication Data
US 2007/0003683 A1   Jan. 4, 2007

(30) Foreign Application Priority Data
Nov. 6, 2003   (JP) ................................. 2003-377510

(51) Int. Cl.
*A23F 5/10* (2006.01)
*A23F 5/26* (2006.01)
*A23F 5/48* (2006.01)

(52) U.S. Cl. .......... 426/594; 426/45; 426/309; 426/312; 426/386; 426/468; 426/511; 426/590; 426/595

(58) Field of Classification Search ................ 426/594, 426/45, 309, 312, 386, 468, 511, 595, 590
See application file for complete search history.

(56) References Cited

U.S. PATENT DOCUMENTS

| | | | |
|---|---|---|---|
| 3,421,901 A * | 1/1969 | Migdol et al. ................. | 426/387 |
| 3,615,666 A | 10/1971 | Schlichter et al. | |
| 3,689,278 A | 9/1972 | Carbonell | |
| 3,997,685 A | 12/1976 | Strobel | |
| 4,352,829 A | 10/1982 | Noyes et al. | |
| 4,486,453 A * | 12/1984 | Morrison et al. ............. | 426/478 |
| 4,983,408 A | 1/1991 | Colton | |
| 5,417,993 A | 5/1995 | Takano et al. | |
| 5,681,607 A | 10/1997 | Maki et al. | |
| 6,231,907 B1 | 5/2001 | Kino et al. | |

FOREIGN PATENT DOCUMENTS

| | | | |
|---|---|---|---|
| DE | 19826143 A1 * | 12/1999 | |
| EP | 0 079-242 | 5/1983 | |
| EP | 0489401 A | 6/1992 | |
| EP | 0530880 A | 3/1993 | |
| JP | 59-109133 | 6/1984 | |
| JP | 61-119140 | 6/1986 | |
| JP | 01-252250 | 10/1989 | |
| JP | 01-256347 | 10/1989 | |
| JP | 02-046267 | 2/1990 | |
| JP | 02-203749 | 8/1990 | |
| JP | 02-203750 | 8/1990 | |
| JP | 04-093642 | 3/1992 | |
| JP | 04-170497 | 6/1992 | |
| JP | 05-123108 | 5/1993 | |
| JP | 6-30754 | 2/1994 | |
| JP | 06-276941 | 10/1994 | |
| JP | 10-077496 | 3/1998 | |
| JP | 2005-050801 | 2/2000 | |
| JP | 2000-083587 | 3/2000 | |
| JP | 2000-135059 | 5/2000 | |
| JP | 2000-166474 | 6/2000 | |
| JP | 2001-292721 | 10/2001 | |
| JP | 2003-033137 | 2/2003 | |
| JP | 2003-144050 | 5/2003 | |
| JP | 2003144050 A | 5/2003 | |
| JP | 2003-204757 | 7/2003 | |
| JP | 2004-298065 | 10/2004 | |

OTHER PUBLICATIONS

Machine Translation JP 2003-033137 (2003).*
Translation of JP 2003144050 (Okada et al.), see Applicant's IDS for JP 2003144050.*
Improvements in and relating to coffee extract (GB 1057840), published Feb. 8, 1967.*
Translation of DE 19826143 A1 (See above.), Suwelack Nachf, Dec. 16, 1999, pp. 1-5.*
JPO Publication, Common and Well-known technologies (aroma chemical) First section, General Aroma Chemical, Jan. 29, 1999, p. 61-65.

* cited by examiner

*Primary Examiner* — Brent T O'Hern
(74) *Attorney, Agent, or Firm* — Novak Druce + Quigg LLP; Joseph W. Bain

(57) ABSTRACT

Volatile components are obtained by steam extraction of tasty materials. Coffee beans following roasting or tea leaves following tea manufacturing are used as tasty materials. Steam extraction includes of processing in which steam is contacted with a tasty material followed by recovery of the steam after that contact. Saturated water vapor or super heated steam is used for the steam, while super heated steam is used preferably. The coffee beans are preferably those that have been obtained by roasting raw coffee beans using super heated steam. The food or drink contains the aromatic components, and preferably contains the volatile components as well as an aqueous extract of the tasty material.

13 Claims, 1 Drawing Sheet

METHOD OF EXTRACTING VOLATILE COMPONENT FROM TASTY MATERIAL, THE VOLATILE COMPONENT AND FOODS AND DRINKS CONTAINING THE VOLATILE COMPONENT

FIELD OF THE INVENTION

The present invention relates to a method of extracting volatile components for obtaining volatile components contained in tasty materials composed of coffee beans following roasting or tea leaves following tea manufacturing, volatile components obtained by this extraction method, and foods and drinks containing those volatile components.

BACKGROUND OF THE INVENTION

As foods and drinks containing large amounts of aromatic components of coffee, those produced, for example, according to the concentrated coffee liquid production process indicated in Patent Document No. 1 are known (see below). In this production process, a coffee liquid extracted from roasted and ground coffee beans is first concentrated. At this time, the coffee liquid is separated into a concentrate obtained by partially removing the moisture from the aforementioned coffee liquid, and a concentrated removal liquid containing the moisture removed in the process by which the concentrate is obtained. Next, by concentrating the aforementioned concentrated removal liquid by applying a pressure of 0.98 MPa or less using a reverse osmosis membrane, the aromatic components in the concentrated removal liquid are concentrated to obtain a concentrated aromatic liquid. Finally, the aforementioned concentrated aromatic liquid and the aforementioned concentrate are mixed to prepare a concentrated coffee liquid. A known extraction device and extraction method are used when extracting the aforementioned coffee liquid. As a result, according to this production process, aromatic components lost in the coffee liquid concentration process can be efficiently recovered. In particular, by concentrating the aforementioned concentrated removal liquid at as low a pressure as possible using a reverse osmosis membrane having a high separation capacity, the aromatic components contained in the concentrated removal liquid can be effectively recovered.

However, since a known extraction device and extraction method are used in this production process when extracting coffee liquid, there is a high possibility that numerous aromatic components are lost in the extraction process. Consequently, even if aromatic components are able to be recovered at high efficiency in the subsequent step in which a concentrated aromatic liquid is obtained, the aromatic components that have already been lost cannot be recovered. In particular, since the aromatic components lost during extraction of the aforementioned coffee liquid are extremely volatile and have a unique aroma only possessed by freshly roasted coffee, the development of a technology is sought that is capable of minimizing this loss as much as possible.

The present invention has been achieved by paying attention to these problems present in the prior art. One of the objects of the present invention is to provide a method of extracting volatile components by which volatile components can be recovered from tasty materials both easily and high efficiently. Another object of the present invention is to provide volatile components containing a high proportion of preferable aromatic components contained in tasty materials, and foods and drinks containing those volatile components.

Patent Document No. 1: Japanese Laid-open Patent Publication No. 2003-204757

SUMMARY OF THE INVENTION

One aspect of the present invention provides a method of extracting volatile components by which volatile components are obtained by steam extraction of tasty materials. Moreover, the aforementioned steam extraction is characterized by a process in which with the aforementioned tasty material are contacted with steam followed by recovery of the steam after that contact.

Another aspect of the present invention provides a volatile component obtained by the aforementioned method of extracting volatile components.

Still another aspect of the present invention provides a food or drink that contains the aforementioned volatile component.

DESCRIPTION OF THE PREFERRED EMBODIMENTS

Figure 1A:
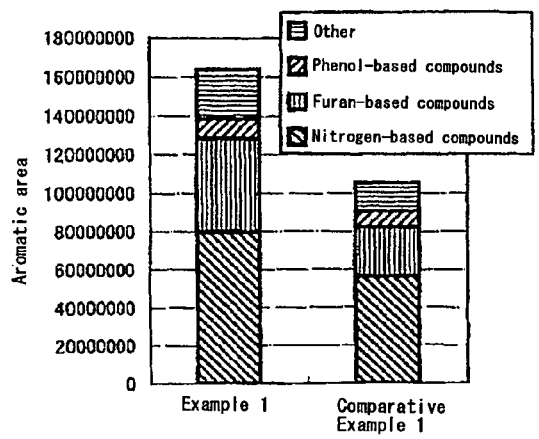
FIG. 1(a) is a graph showing the results of an aromatic component evaluation test of Example 1.

The following provides a detailed explanation of an embodiment that embodies the method of extracting volatile components, volatile components and foods and drinks containing those volatile components of the present invention.

A volatile component of the present embodiment is obtained by steam extraction of a tasty material composed of coffee beans following roasting or tea leaves following tea manufacturing. The majority of this volatile component includes of aromatic components serving as the source of the aroma of the aforementioned tasty material, while also containing some flavor components that have an effect on taste. The aforementioned aromatic components contain water-soluble aromatic components typically referred to as providing the aroma, and oil-soluble aromatic components such as coffee oil, and these components are highly aromatic. Examples of the aforementioned flavor components include chlorogenic acid, trigonelline, formic acid, acetic acid and caffeine. Volatile components that contain these aromatic components and flavor components can be extracted extremely efficiently by steam extraction. On the other hand, in the case of water extraction by immersing the aforementioned tasty material in water at 0 to 100° C., not only are the aforementioned volatile components unable to be adequately extracted, there are hardly any volatile components present in the scattered matter that volatilizes during water extraction.

Highly aromatic coffee beans following roasting or tea leaves following tea manufacturing are used for the tasty material. These tasty materials are used in steam extraction in the dry state in order to minimize the loss of volatile components. Dry tasty materials are not subjected to treatment involving immersion in water or steaming with water. The aforementioned tea leaves are normally produced by going through a widely known tea manufacturing process including of steaming, kneading and drying freshly picked tea leaves.

Examples of types of tea leaves include those that can be used in drinks such as green tea, oolong tea, black tea, barley tea, adlay tea, jasmine tea, Pu-Erh tea, rooibos tea and herb tea. These tea leaves may be used alone or multiple types may be used in combination.

Although *Coffea arabica, C. canephora* var. *robusta, C. canephora* var. *conulon* or *C. liberica* are preferably used for the types of coffee beans in consideration of their high content of aromatic components, there are no particular limitations thereon. These coffee beans may be used alone, or multiple types of coffee beans may be blended. Although the L value (Lightness value) of the roasted coffee beans is preferably about 15 to 33, there are no particular limitations on this value. At least one type of method selected from far infrared roasting, hot air roasting, direct flame roasting and charcoal roasting is used for the roasting method. In the case the aforementioned roasting degree, L value is less than 15, there is a high risk of an increase in the smoky odor produced when the tasty material is roasted (calcined). Conversely, if the L value is greater than 33, it becomes difficult to obtain the preferable roasted aroma unique to coffee. Although there are no particular limitations on the form of the coffee beans following roasting provided it is a form that allows water extraction, the coffee beans are preferably ground or crushed since this enables volatile components to be extracted with high efficiency. There are no particular limitations on the grain size or shape of the ground or crushed coffee beans. It is preferable to use coffee beans immediately after roasting (preferably within one month, and more preferably within 10 days) in order to minimize the loss of volatile components. Furthermore, in cases in which it is difficult to use coffee beans immediately after roasting, the coffee beans are preferably stored in an inert gas atmosphere or at a low temperature.

In the aforementioned steam extraction, after directly contacting the tasty material with steam, the steam following that contact is recovered. Although unsaturated water vapor, saturated water vapor or super heated steam can be used for the aforementioned steam, super heated steam is used most preferably. A high proportion of the aforementioned volatile components are contained in the steam following contact with the aforementioned tasty material.

Unsaturated water vapor is formed by evaporating liquid water at a temperature below the boiling point of water (0° C. to less than 100° C. at normal pressure). The temperature at normal pressure of the unsaturated water vapor during steam extraction is 0° C. to less than 100° C., preferably 50° C. to les than 100° C., more preferably 60° C. to 95° C., and even more preferably 80° C. to 95° C. Saturated water vapor is formed by evaporating liquid water while boiling at the boiling point of water (100° C. at normal pressure). Since this saturated water vapor can be easily produced in large volume, it is used more easily than unsaturated water vapor.

Super heated steam is formed without increasing the pressure applied to the aforementioned saturated water vapor while continuing to heat. This super heated steam is obtained by heating saturated water vapor formed by boiling liquid water in a boiler or by electromagnetic induction heating with a burner, electric heater or electromagnetic induction heating device. When heating the aforementioned saturated water vapor, it is possible to heat while pressurizing the saturated water vapor. However, since it is difficult to control the temperature of the super heated steam by reducing pressure following pressurization, it is preferably heated without pressurizing. An electromagnetic induction heating device normally forms super heated steam by heating a ceramic or metal heating element by electromagnetic induction heating at a frequency of 100 Hz to 100 kHz, and contacting saturated water vapor with the surface of the heating element.

The temperature of the super heated steam during steam extraction is higher than 100° C. at normal pressure, preferably higher than 100° C. to 500° C. at normal pressure, more preferably higher than 107° C. to 500° C. at normal pressure, still more preferably higher than 140° C. to 500° C. at normal pressure, and even more preferably 250° C. to 500° C. at normal pressure. In the case where the super heated steam exceeds 500° C., in addition to there being a high risk of causing deterioration in the quality of the volatile components due to the considerable effects of the heat on the tasty material, it is also uneconomical. On the other hand, since super heated steam has a transition point at 107° C. at normal pressure ($1.01325 \times 10^5$ Pa, or 1 atmosphere), when at a temperature higher than this transition point, it becomes extremely stable thermodynamically. When heating saturated water vapor at the aforementioned transition point, the majority of the quantity of heat applied is used as latent heat that is consumed for changing the state of the substance. Therefore, it is difficult to raise the temperature of that substance. Furthermore, in the case of super heated steam in the aforementioned thermodynamically stable state, when heat is applied to the super heated steam, a temperature rise is induced in the super heated steam that is proportional to the quantity of heat applied. In this case, the aforementioned quantity of heat applied is used as sensible heat. Incidentally, in the case of water, the aforementioned transition point is present at 100° C. at normal pressure (the so-called boiling point), and the latent heat at this time is used as the heat of vaporization during boiling.

The amount of steam used for this steam extraction is preferably 0.3 to 30 kg/h, more preferably 0.6 to 20 kg/h, and even more preferably 1.2 to 10 kg/h per 1 kg of tasty material. In the case where the amount of steam is less than 0.3 kg/h, extraction efficiency becomes poor since more time is required to recover the volatile components. Conversely, in the case where the amount of steam exceeds 30 kg/h, the pressure inside the devices used to generate the steam increases, thereby increasing the cost of the equipment for controlling pressure or requiring more installation space.

Extraction time in the case of carrying out steam extraction with this preferable amount of steam is preferably 5 to 60 minutes, more preferably 6 to 30 minutes, and even more preferably 7 to 20 minutes. In the case where the aforementioned extraction time is less than 5 minutes, it is not possible to efficiently extract volatile components from the tasty material. Conversely, in the case where the extraction time exceeds 60 minutes, deterioration of volatile components proceeds easily. In the case of steam extraction in excess of 30 minutes using super heated steam in particular, the tasty material becomes susceptible to roasting (calcination) resulting in the risk of an increase in smoky odor. Incidentally, in the case of carrying out steam extraction using saturated water vapor or super heated steam, although the majority of the volatile components are extracted within 30 minutes, in the case of carrying out industrial water extraction, roughly 1 hour is required.

This steam extraction is preferably carried out in a sealed container in order to reduce recovery loss caused by scattering and diffusion of volatile components. In addition, although this steam extraction is normally carried out at normal pressure, it may also be carried out under increased pressure. Moreover, since this steam extraction enables the obtaining of volatile components having superior aroma by preventing oxidative deterioration, it is most preferably carried out in an inert gas atmosphere such as nitrogen gas or a rare gas (a so-called deoxygenated state). Incidentally, steam produced using water from which dissolved oxygen has been removed (so-called deoxygenated water) contains hardly any dissolved oxygen. Consequently, after replacing the atmosphere inside a sealed container into which a tasty material has been charged with an inert gas, if steam extraction is carried out using steam produced from the aforementioned deoxygenated water, the inert gas atmosphere within the sealed container is easily and continuously maintained. Furthermore, in the case of carrying out steam extraction in an inert gas atmosphere, it is most preferable to similarly carry out recovery of volatile components as well as all other product production steps (for example, coffee bean roasting step, and food or drink production steps) in an inert gas atmosphere.

Although it varies depending on the type of tasty material, the typical recovery rate of volatile components by steam extraction is suitably 0.01 to 10% by weight (Brix 0.01 to 10) as a solid with respect to the tasty material. However, it is preferably 0.05 to 5% by weight (Brix 0.05 to 5) as a solid in consideration of quality aspects. In the case where the aforementioned recovery rate is less than 0.01% by weight, an adequate amount of volatile components is not recovered. Conversely, in the case where the aforementioned recovery rate exceeds 10% by weight, components other than the volatile components, namely components that can be stably recovered by simple extraction methods such as water extraction despite carrying out steam extraction, are recovered in large amounts, thereby making this uneconomical.

After recovering the volatile components in the form of a liquid, granules, powder, solid or semi-solid, they are either stored in the sealed container or added to a food or drink. Liquid volatile components are obtained by collecting the steam and cooling after contacting with a tasty material in the aforementioned steam extraction. Granular or powdered volatile components are obtained by drying the aforementioned liquid volatile components or steam after contacting with the aforementioned tasty material by freeze-drying or spray drying. Solid or semi-solid volatile components are obtained by heat-drying or concentrating the aforementioned liquid volatile components in accordance with ordinary methods. Furthermore, at this time, only a desired component can be selectively recovered by fractioning by distillation or vacuum distillation using the chemical properties of the volatile components, or by purifying using a resin column.

A first food or drink of the present embodiment is composed of a liquid that contains the aforementioned volatile components, examples of which include drinks such as a coffee drink, tea drink, milk drink (such as a milk-containing coffee drink or milk-containing tea drink) or soft drink, or concentrated extracts for dispensers. A first food or drink is produced by going through a step in which the aforementioned volatile components are mixed. In the case of storing a first food or drink, sterilization treatment is preferably carried out either immediately after making up a liquid food such as a drink, or immediately after filling and sealing into a container. Although volatile components mixed into a first food or drink may be in any form such as a liquid, granules, powder, solid or semi-solid, since the first food or drink itself is a liquid, it is easiest and most economical to mix in a liquid volatile component.

In a first food or drink, a coffee drink or tea drink preferably contains a water extract obtained by water extraction of a tasty material (first tasty material) following steam extraction of the aforementioned volatile components. Components that are poorly volatile contained in the aforementioned first tasty material (hardly volatile components), and components that are not volatile (non-volatile components) are contained in the aforementioned water extract. In addition, in order to provide a product having a particularly high content of volatile components, the coffee drink or tea drink may contain water extracts obtained by water extraction of a tasty material not targeted by steam extraction (second tasty material). The aforementioned second tasty material preferably uses the same type of raw material as the aforementioned first tasty material. Although the use of the same type of tasty material refers to the use of coffee beans (second tasty material) in water extraction as well as in the case of using coffee beans (first tasty material) during steam extraction, the types of coffee beans (first and second tasty materials) do not have to coincide. This applies similarly to tea leaves as well.

In the aforementioned water extraction, components that elute into water (namely, water extracts) are recovered by immersing a tasty material in water at 0 to 100° C., preferably water at 50 to 100° C., more preferably hot water at 60 to 95° C., and even more preferably hot water at 80 to 95° C. as previously mentioned. Although conditions such as the extraction temperature during water extraction, extraction time and extraction method are suitably determined depending on the raw material, water extraction should be carried out in accordance with ordinary methods. Furthermore, although there are no particular limitations on the method used for water extraction, a drip method, multi-column method or jet method is employed in the case of coffee, while a kneading method is employed in the case of tea drinks. In addition, two or more types of extraction methods may be used in combination. Furthermore, the water extract following water extraction may also be concentrated by a method such as freeze concentration, membrane concentration or vacuum heating concentration.

A second food or drink of the present embodiment is that other than the aforementioned liquid containing the volatile components (namely, granules, powder, solid or semi-solid), examples of which include instant coffee, instant tea, cake, Japanese-style confections and snacks. A second food or drink is produced by going through a step in which the aforementioned volatile components are mixed. Although the volatile components mixed into the second food or drink may be in any form such as a liquid, granules, powder, solid or semi-solid, the form that is the simplest and most economical is preferably selected depending on the form of the second food or drink.

In the case of a second food or drink, instant coffee or instant tea preferably contains a water extract obtained by water extraction of a tasty material (first tasty material) following steam extraction of the aforementioned volatile components. In addition, in order to provide a product having a particularly high content of volatile components, this instant coffee or instant tea may also contain a water extract obtained by water extraction of a tasty material (second tasty material) not targeted by steam extraction. In the production of a second food or drink, the extraction temperature during water extraction is industrially preferably 0 to 200° C. and more preferably 50 to 170° C., and the water extraction may also be carried out under the same conditions as water extraction in the case of the aforementioned first food or drink.

Instant coffee or instant tea containing volatile components and water extract is produced by a first or second production process. In the first production process, liquid volatile components are mixed into the water extract either before drying the water extract (or before drying a concentrate of the water extract) or during drying. Although the aforementioned drying is preferably carried out by freeze-drying or spray drying, it may also be carried out by heat drying. In the first production process, in the case of mixing volatile components during drying of the water extract, the volatile components and water extract can be mixed during drying by drying both with the same freeze-dryer or spray dryer. In addition, in the second production process, granular, powdered or solid volatile components and water extract after drying are each prepared followed by mixing.

After being produced according to the first or second production process, granular, powdered or solid instant coffee or instant tea can be granulated to a predetermined grain size by using the liquid water extract or liquid volatile components used in its production as binder. In addition, solid instant coffee or instant tea can be powdered by crushing, and can also be granulated in accordance with known granulation methods in consideration of solubility in water.

The first and second foods or drinks are preferably obtained as finished products by sealing in a sealable pouch or container in order to reduce the loss of volatile components. Examples of the aforementioned sealable pouches and containers include cans, bottles, PET containers, paper containers, plastic containers and aluminum pouches. In addition, the first and second foods or drinks may also be produced while adding known additives. Examples of the aforementioned additives include dairy products such as milk, powdered skim milk, powdered whole milk and cream, fruit juice, vegetable juice, sugar, sugar-alcohol, sweetener, pH adjusters such as sodium bicarbonate, emulsifiers such as sucrose fatty acid ester and glycerol fatty acid ester, fragrances and stabilizers such as carrageenan. These additives may be added alone or multiple types of additives may be added in combination. In the first food or drink production process, the aforementioned additives are preferably added simultaneously with mixing of the volatile components. In the second food or drink production process, the aforementioned additives may be added at any stage until completion of drying. In addition, dried additives are used in the case of adding additives following completion of drying. Furthermore, the first and second foods or drinks are preferably exposed only to an inert gas atmosphere from making up to filling and containment in a container (in a so-called deoxygenated state), and deoxygenated raw materials and additives are used most preferably.

The present embodiment offers the advantages described below.

Volatile components of the present embodiment are obtained by steam extraction of a tasty material composed of coffee beans following roasting or tea leaves following tea manufacturing. Namely, these volatile components contain a high proportion of highly volatile components recovered by steam extraction prior to water extraction of the tasty material. Moreover, the aforementioned steam extraction allows highly volatile components to be extracted extremely rapidly, efficiently and specifically as compared with water extraction. Consequently, in addition to containing a high proportion of satisfactory aromatic components contained in the tasty material, since these volatile components are extracted in an extremely short period of time (less than half the time of water extraction), they contain large amounts of high-quality aromatic components having a low degree of deterioration.

On the other hand, in the case of water extraction of the aforementioned tasty material with water at a low temperature, although it becomes easier to obtain high-quality aromatic components, the majority of the volatile components cannot be adequately recovered. In addition, in the case of water extraction with hot water, aroma and taste tend to decrease due to a portion of the aromatic components and volatile components scattering during extraction, or increased susceptibility to deterioration since the duration of exposure to hot water is longer as compared with steam extraction. Aroma and flavor can be enhanced by adding artificially produced extracts and fragrances in order to solve these problems. In this case, however, in addition to it being technically considerably difficult to reproduce the inherent aroma and flavor of the tasty material, it also leads to increased raw material costs. In contrast, the present embodiment is very useful in that yield can be easily enhanced while faithfully reproducing the high-quality aroma and flavor inherent to the tasty material.

In the case of steam extraction using super heated steam, together with somewhat hardly volatile components such as organic acids, caffeine, chlorogenic acid and trigonelline being extracted extremely efficiently, since other highly volatile components are extracted extremely rapidly, volatile components of extremely high quality can be obtained. Since super heated steam conducts heat by both convective heat transfer and radiant heat transfer, thermal efficiency is extremely high as compared with unsaturated water vapor and saturated water vapor. Moreover, since super heated steam is a type of water vapor, the transfer rate of the aforementioned convective heat transfer is also rapid. Super heated steam has the inherent property of water vapor of raising the temperature of a substance by imparting heat to that substance when it contacts a low-temperature substance and condenses, and the property of heating a substance in the manner of heated air. Consequently, the solubility of a component able to dissolve in super heated steam (a volatile component in this case) can be temporarily and instantaneously increased by raising the temperature of the tasty material in a short period of time. In particular, the effect of raising the core temperature of a tasty material in a short period of time is important in terms of making it easier to inhibit deterioration of volatile components by heat as compared with the case of raising the core temperature over the course of a long period of time. Moreover, since the drying rate of super heated steam can be increased more than in the case of using dry air if it exceeds a predetermined temperature (140° C.), volatile components dissolved in the super heated steam can be separated and recovered from the tasty material as a result of instantaneously integrating with the steam. Moreover, at this time, the tasty material undergoes a physicochemical change similar to that during roasting. As a result, according to this process, in addition to it being possible to recover an amount of volatile components greater than or equal to the amount obtained by roasting, the amount of recovered volatile components can easily be maintained at a high level even if roasting is inadequate.

Commercially available instant coffee and instant tea are produced by going through a drying step for lowering the moisture content. Consequently, in the production processes of these commercially available products, highly aromatic components and volatile components contained in tasty materials are susceptible to scattering and deterioration during the drying step, resulting in the problem of the aroma of the finished products being extremely weak. Technologies like freeze-drying, which make it easy to prevent deterioration of components during drying, are widely known to be employed in the production processes of these commercially available products. However, conventional freeze-drying methods do not have a step in which volatile components are added as in the present embodiment, and are also unable to prevent deterioration in steps other than the drying step. In contrast, since high-quality volatile components obtained by specialized steam extraction for the purpose of recovering volatile components are added in a second food or drink of the present embodiment, products having superior flavor and aroma can be provided remarkably easily.

Furthermore, the present embodiment can also be embodied making the modifications described below.

Coffee beans that have been roasted using super heated steam are used for the aforementioned tasty material. Coffee beans that have been roasted using the aforementioned super heated steam instead of a roaster or other known roasting machine are used for the coffee beans. The aforementioned super heated steam should be the same super heated steam used in the steam extraction of the aforementioned embodiment. Furthermore, the amount of super heated steam is preferably somewhat greater than the amount of steam of the aforementioned embodiment. Namely, the amount of super heated steam is preferably 1 kg/h or more, and more preferably 1 to 30 kg/h, per 1 kg of raw coffee beans used as the tasty material. Moreover, at this time, the steam extraction of the aforementioned embodiment can also be carried out following roasting of the raw coffee beans using super heated steam. Furthermore, in this case, instead of recovering the super heated steam following contact with the raw coffee beans during roasting, the super heated steam should be recovered in the form of volatile components after the L value has reached 33 or lower.

In this case, it is possible to provide a superior tasty material for which it is easy to extract large amounts of high-quality volatile components. In addition, since the core temperature of the raw coffee beans can be raised in a short period of time in the case of roasting with super heated steam, roasting can be completed in a remarkably short period of time. Moreover, since the inside and outside of the raw coffee beans are heated simultaneously in the case of roasting with super heated steam, the raw coffee beans can be roasted evenly thereby reducing the unpleasant harsh taste and bitterness associated with uneven roasting, and making it easy to bring out a refreshing, mild flavor. In addition, since roasting with super heated steam at a temperature above 140° C. accelerates drying faster than heated dry air, steaming and drying can be carried out simultaneously, making it easy to obtain porous coffee beans. In addition, effects are also obtained at this time that suppress the formation of organic acids such as formic acid and acetic acid, as well as improve the stability of milk components that are added.

The following provides a more detailed explanation of the present invention through examples.

EXAMPLE 1

After grinding 3 kg of coffee beans having the L value 21 (arabica coffee beans roasted by far infrared roasting), the roasted coffee beans were charged into a sealable extraction container. Subsequently, the air inside the aforementioned extraction container was replaced with nitrogen gas (normal pressure). Then, super heated steam at about 300° C. was continuously injected into the container from beneath the ground coffee beans inside to allow the super heated steam to contact the ground coffee beans. The aforementioned super heated steam was formed by contacting saturated water vapor generated by a boiler with a metal heating element heated by electromagnetic induction heating at a frequency of 20 kHz, and fed directly into the extraction container. Liquid volatile components were then recovered by collecting the steam flowing out from the top of the aforementioned extraction container and cooling (Brix 1.0). Injection of the aforementioned super heated steam was discontinued when 1 liter of volatile components were obtained. The extraction time was about 15 minutes.

Next, 24 liters of an aqueous coffee extract of Brix 3.3 were obtained by water extraction of the aforementioned ground coffee beans following extraction of volatile components using hot water at 95° C. The extraction time was about 1 hour. Finally, the total amounts of the resulting volatile components and aqueous extract were respectively mixed followed by the addition of 31.9 g of sodium bicarbonate and adjusting to a total volume of 63.8 liters using water. As a result, a coffee drink having a Brix 1.3 and pH 6.10 was prepared. After filling this coffee drink into metal cans and sealing, a canned coffee drink was produced by sterilizing for 5 minutes at 123° C.

COMPARATIVE EXAMPLE 1

After 3 kg of coffee beans having the L value 21 were ground, the ground coffee beans were charged into a sealable extraction container. After replacing the air inside the aforementioned extraction container with nitrogen gas (normal pressure), 24 liters of an aqueous coffee extract of Brix 3.3 were obtained by water extraction using hot water at 95° C. Steam extraction was not carried out in this Comparative Example 1. 31.9 g of sodium bicarbonate were added to the resulting aqueous extract followed by adjusting to a total volume of 63.8 liters using water. As a result, a coffee drink having a Brix 1.3 and pH 6.10 was prepared. A canned coffee drink was produced in the same manner as Example 1 using this coffee drink.

<Aromatic Component Evaluation Test 1>

Aromatic components were analyzed using the canned coffee drinks of Example 1 and Comparative Example 1. Namely, each of the components contained in the coffee drinks were analyzed by solid-phase micro extraction (SPME) by adsorbing onto a solid-phase micro extraction (SPME) resin using a gas chromatograph mass analyzer (GC-MS, Hewlett-Packard, GC System HP6890 Series). During analysis, samples were injected using a split system, and DB-WAX (Agilent Technologies) was used for the capillary column. In addition, after holding for 3 minutes at 40° C. while allowing helium gas to flow through at 1.0 mL/min, the temperature was raised to 240° C. at a rate of 5° C./min and then held for 5 minutes at 240° C. to separate the aromatic components and obtain a chromatogram. The areas of the peaks indicated by each of the aromatic components were quantified from the resulting chromatogram. Those results are shown in FIG. 1(a). According to the results of FIG. 1(a), the peak area of each of the aromatic components contained in the coffee drink of Example 1 was confirmed to be significantly larger than that of Comparative Example 1.

<Aromatic Component Panelist Test>

Flavor and aroma were evaluated by expert panelists for the canned coffee drinks of Example 1 and Comparative Example 1. Namely, 15 expert panelists were given 1 sample each of the canned coffee drinks of Example 1 and Comparative Example 1 and asked to score them based on an absolute evaluation according to one of seven ranks, after which their average scores were determined. The aforementioned evaluation consisted of an evaluation of strength of aroma and an overall evaluation. Those results are shown in Table 1.

TABLE 1

|  | Comparative Example 1 | Example 1 |
| --- | --- | --- |
| Strength of aroma | −0.23 | +0.67 |
| Overall evaluation | +0.37 | +0.40 |

In the evaluation of strength of aroma according to one of seven ranks in Table 1, an extremely weak aroma was scored −3, a weak aroma −2, a somewhat weak aroma −1, neither weak not strong 0, somewhat strong aroma +1, strong aroma +2 and extremely strong aroma +3. In the overall evaluation in the same table, an extremely poor comprehensive quality evaluation of flavor and aroma was scored −3, poor evaluation −2, somewhat poor evaluation −1, neither poor or good 0, somewhat good evaluation +1, good evaluation +2 and extremely good evaluation +3. According to the results of Table 1, the aroma of the coffee drink of Example 1 was confirmed to be significantly better than that of Comparative Example 1. In addition, in the overall evaluation, the coffee drink of Example 1 was confirmed to be better than that of Comparative Example 1.

EXAMPLE 2

300 g of commercially available green tea leaves (Kabuse-Cha) following tea manufacturing were charged into a sealable extraction container. Subsequently, the air inside the aforementioned extraction container was replaced with nitrogen gas (normal pressure). Then, saturated water vapor at 100° C. was continuously injected into the container from beneath the tea leaves to allow the saturated water vapor to make direct contact with the tea leaves. The steam that flowed out from the top of the aforementioned extraction container was then collected and cooled to recover liquid volatile components (Brix 0.07). Injection of the aforementioned saturated water vapor was discontinued when 300 mL of volatile components were obtained. Next, following extraction of the aforementioned volatile components, the tea leaves were subjected to water extraction using hot water at 60° C. As a result, 9 liters of an aqueous extract of green tea containing 300 mg/100 mL of tannin were obtained. Finally, 300 mL of the resulting volatile components, 6 liters of the aqueous extract, 7.8 g of sodium bicarbonate and 12.0 g of vitamin C were mixed and adjusted to a total volume of 30 liters using water. As a result, a green tea drink containing 60 mg/100 mL of tannin was obtained. This green tea drink was filled into metal cans and sealed followed by sterilizing for 20 minutes at 119° C. to produce a canned green tea drink.

COMPARATIVE EXAMPLE 2

300 g of commercially available green tea leaves (Kabuse-Cha) following tea manufacturing were charged into a sealable extraction container. Subsequently, after replacing the air inside the aforementioned extraction container with nitrogen gas (normal pressure), water extraction was carried out using hot water at 60° C. As a result, 9 liters of an aqueous extract of green tea containing 300 mg/100 mL of tannin were obtained. Steam extraction was not carried out in this Comparative Example 2. The resulting aqueous extract was then used to produce a canned green tea drink in the same manner as Example 2.

<Aromatic Component Evaluation Test 2>

Figure 1B:
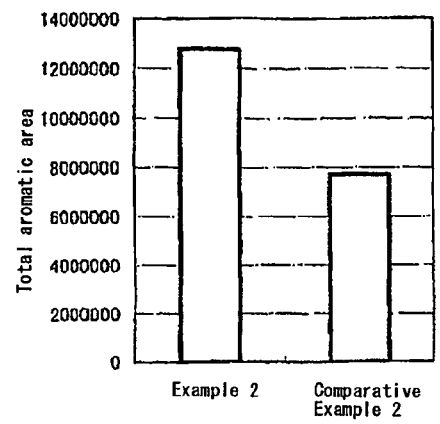
FIG. 1(b) is a graph showing the results of an aromatic component evaluation test of Example 2.

Evaluation tests were carried out by GC-MS on the canned green tea drinks of Example 2 and Comparative Example 2 in the same manner as the aforementioned Aromatic Component Evaluation Test 1. Those results are shown in FIG. 1(b). As a result, the total amount of aromatic components contained in the green tea drink of Example 2 was confirmed to be significantly greater than that of Comparative Example 2.

EXAMPLE 3

After grinding 3 kg of coffee beans having the L value 21, the roasted coffee beans were charged into a sealable extraction container. Subsequently, the air inside the aforementioned extraction container was replaced with nitrogen gas (normal pressure). Then, super heated steam at about 300° C. was continuously injected into the container from beneath the ground coffee beans inside to allow the super heated steam to contact the ground coffee beans. Liquid volatile components were then recovered by collecting the steam flowing out from the top of the aforementioned extraction container and cooling (Brix 1.2). Injection of the aforementioned super heated steam was discontinued when 1 liter of volatile components were obtained. Next, 24 liters of an aqueous coffee extract of Brix 3.3 were obtained by water extraction of the aforementioned ground coffee beans following extraction of volatile components using hot water at 95° C. Finally, the total amounts of the resulting volatile components and aqueous extract were mixed and spray-dried at a spraying temperature of 170° C. using the Model GA-32 Parvis Mini Spray Dryer (Yamato). As a result, a powdered instant coffee was prepared.

EXAMPLE 4

After grinding 3 kg of coffee beans having the L value 21, the roasted coffee beans were charged into a sealable extraction container. Subsequently, the air inside the aforementioned extraction container was replaced with nitrogen gas (normal pressure). Then, saturated water vapor at 100° C. was continuously injected into the container from beneath the ground coffee beans inside to allow the saturated water vapor to contact the ground coffee beans. Liquid volatile components were then recovered by collecting the steam flowing out from the top of the aforementioned extraction container and cooling (Brix 1.3). Injection of the aforementioned saturated water vapor was discontinued when 1 liter of volatile components was obtained. Next, 24 liters of an aqueous coffee extract of Brix 3.2 were obtained by water extraction of the aforementioned ground coffee beans following extraction of volatile components using hot water at 95° C. Finally, the total amounts of the resulting volatile components and aqueous extract were mixed and spray-dried at a spraying temperature of 170° C. using the Model GA-32 Parvis Mini Spray Dryer (Yamato). As a result, a powdered instant coffee was prepared.

COMPARATIVE EXAMPLE 3

After grinding 3 kg of coffee beans having the L value 21, the roasted coffee beans were charged into a sealable extraction container. Subsequently, after replacing the air inside the aforementioned extraction container with nitrogen gas (normal pressure), 24 liters of an aqueous coffee extract of Brix 3.2 were obtained by water extraction of the aforementioned ground coffee beans using hot water at 95° C. Steam extraction was not carried out in this Comparative Example 3. Finally, the resulting aqueous extract was spray-dried at a spraying temperature of 170° C. using the Model GA-32 Parvis Mini Spray Dryer (Yamato). As a result, a powdered instant coffee was prepared.

<Aromatic Component Evaluation Test 3>

Figure 1C:
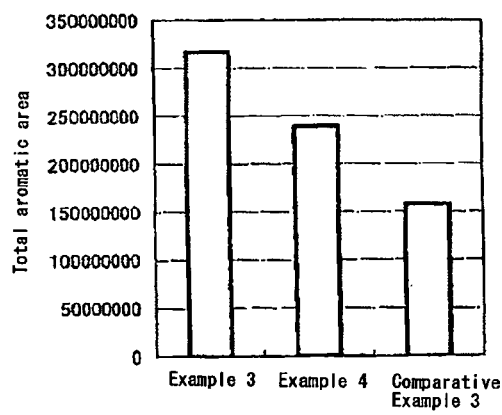
FIG. 1(c) is a graph showing the results of aromatic component evaluation tests of Examples 3 and 4.

Aqueous solutions in which soluble solids were dissolved to a concentration of 7% were prepared using the instant coffee of Examples 3 and 4 and Comparative Example 3, and evaluation tests by GC-MS were carried out on each aqueous solution in the same manner as the aforementioned Aromatic Component Evaluation Test 1. Those results are shown in FIG. 1(c). As a result, the total amount of aromatic components contained in the instant coffee of Examples 3 and 4 was confirmed to be significantly greater than that of Comparative Example 3. Moreover, the content of aromatic components of Example 3, which was steam extracted with super heated steam, was confirmed to be significantly greater than that of Example 4, which was steam extracted with saturated water vapor.

<Volatile Component Analytical Test 1>

Analytical tests were carried out on the main aromatic components and flavor components in the volatile components obtained in Examples 3 and 4 to confirm the effects of steam extraction. Aromatic components were analyzed by GC-MS in the same manner as previously described. In the analysis of flavor components, chlorogenic acid, caffeine and trigonelline were analyzed by HPLC using a UV detector, while organic acids were analyzed by HPLC using an ion conductivity detector. Those results are shown in Table 2.

TABLE 2

| | Flavor Components | | | | |
|---|---|---|---|---|---|
| | Trigonelline | Chlorogenic acid | Caffeine | Formic acid | Acetic acid |
| Example 3 | 11.08 mg/100 ml | 80.32 mg/100 ml | 10.11 mg/100 ml | 698.46 ppm | 6797.89 ppm |
| Example 4 | 5.05 mg/100 ml | 42.10 mg/100 ml | 3.76 mg/100 ml | 518.72 ppm | 8320.95 ppm |

| | Aromatic Components | | | |
|---|---|---|---|---|
| | 2-[(methylthio)methyl)]-Furan | Furfuryl acetate | 2,2'-methylenebis-Furan | 4-Ethyl guaincol |
| Example 3 | 8651316 | 31970460 | 16094047 | 6202782 |
| Example 4 | 2207674 | 26599341 | 14245386 | 5531796 |

According to Table 2, steam extraction using super heated steam was clearly demonstrated to enable extraction of chlorogenic acid and other flavor components and aromatic components of coffee at significantly higher rates than steam extraction using saturated water vapor.

EXAMPLE 5

300 g of commercially available green tea leaves following tea manufacturing were charged into a sealable extraction container. Subsequently, the air inside the aforementioned extraction container was replaced with nitrogen gas (normal pressure). Then, saturated water vapor at 100° C. was continuously injected into the container from beneath the tea leaves to allow the saturated water vapor to make direct contact with the tea leaves. The steam that flowed out from the top of the aforementioned extraction container was then collected and cooled to recover liquid volatile components (Brix 0.07). Injection of the aforementioned saturated water vapor was discontinued when 300 mL of volatile components were obtained. Next, following extraction of the aforementioned volatile components, the tea leaves were subjected to water extraction using hot water at 60° C. As a result, 9 liters of an aqueous extract of green tea of Brix 0.8 containing 300 mg/100 mL of tannin were obtained. 300 mL of the resulting volatile components and 9 liters of the aqueous extract were mixed. Dextrin of 1.8-hold amount (129.6 g) with respect to soluble solids was added as a vehicle. Finally, the volatile components and the aqueous extract were spray-dried at a spraying temperature of 170° C. using the Model GA-32 Parvis Mini Spray Dryer (Yamato). As a result, a powdered instant tea was prepared.

COMPARATIVE EXAMPLE 4

300 g of commercially available green tea leaves following tea manufacturing were charged into a sealable extraction container. Subsequently, the air inside the aforementioned extraction container was replaced with nitrogen gas (normal pressure). Then, the tea leaves were subjected to water extraction using hot water at 60° C. As a result, 9 liters of an aqueous extract of green tea of Brix 0.8 containing 300 mg/100 mL of tannin were obtained. Steam extraction was not carried out in this Comparative Example 4. Dextrin of 1.8-hold amount (129.6 g) with respect to soluble solids was added as a vehicle to the resulting aqueous extract. The aqueous extraction was spray-dried at a spraying temperature of 170° C. using the Model GA-32 Parvis Mini Spray Dryer (Yamato). As a result, a powdered instant tea was prepared.

<Aromatic Component Evaluation Test 4>

Figure 1D:
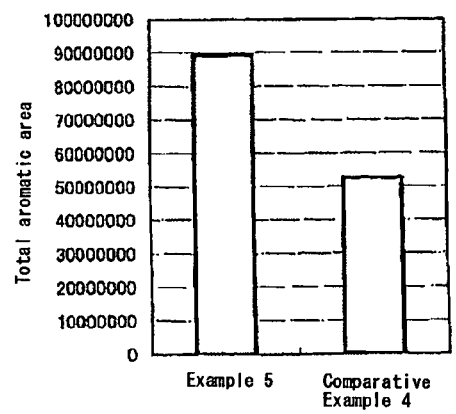
FIG. 1(d) is a graph showing the results of an aromatic component evaluation test of Example 5.

Aqueous solutions in which soluble solids were dissolved to a concentration of 16% were prepared using the instant teas of Example 5 and Comparative Example 4, and evaluation tests by GC-MS were carried out on each aqueous solution in the same manner as the aforementioned Aromatic Component Evaluation Test 1. Those results are shown in FIG. 1(d). As a result, the total amount of aromatic components contained in the instant tea of Example 5 was confirmed to be significantly greater than that of Comparative Example 4.

EXAMPLE 6

300 g of commercially available green tea leaves following tea manufacturing were charged into a sealable extraction container. Subsequently, the air inside the aforementioned extraction container was replaced with nitrogen gas (normal pressure). Then, saturated water vapor at 100° C. was continuously injected at a steam volume of 50 mL per minute into the container from beneath the tea leaves to allow the saturated water vapor to make direct contact with the tea leaves. The steam that flowed out from the top of the aforementioned extraction container was then cooled immediately. As a result, 300 mL of liquid volatile components (Brix 0.07, pH 6.51) were recovered.

EXAMPLE 7

300 g of commercially available green tea leaves following tea manufacturing were charged into a sealable extraction container. Subsequently, the air inside the aforementioned extraction container was replaced with nitrogen gas (normal pressure). Then, super heated steam at 300° C. was continuously injected at a steam volume of 60 mL per minute into the container from beneath the tea leaves to allow the super heated steam to make direct contact with the tea leaves. The steam that flowed out from the top of the aforementioned extraction container was then cooled immediately. As a result, 300 mL of liquid volatile components (Brix 0.07, pH 6.52) were recovered.

<Volatile Component Analytical Test 2>

Component evaluation tests of major aromatic components were carried out on the volatile components of Examples 6 and 7 in the same manner as the aforementioned Volatile Component Analytical Test 1. The content (%) of each aromatic component is shown in Table 3.

TABLE 3

|  | Example 6 | Example 7 |
|---|---|---|
| Nonanal | 1.34% | 2.76% |
| 3,7-dimethyl-1,6-Octadien-3-ol | 2.62% | 3.49% |
| 4-(2,6,6-trimethyl-3-Buten-2-one | 3.93% | 5.47% |
| 3,7,11-tri 1,6,10-Dodecatrien-3-ol | 26.87% | 34.90% |

According to Table 3, steam extraction using super heated steam clearly demonstrated a significantly higher recovery rate of volatile components as compared with steam extraction using saturated water vapor.

EXAMPLE 8

After grinding 20 kg of coffee beans having the L value 21 (arabica coffee beans roasted by far infrared roasting), the roasted coffee beans were charged into a sealable extraction container. Subsequently, the air inside the aforementioned extraction container was replaced with nitrogen gas (normal pressure). Then, super heated steam at about 180° C. was continuously injected at a steam volume of about 40 kg/h into the container from beneath the ground coffee beans inside to allow the super heated steam to contact the ground coffee beans. The aforementioned super heated steam was formed by contacting saturated water vapor generated by a boiler with a metal heating element heated by electromagnetic induction heating at a frequency of 35 kHz, and it was fed directly into the extraction container. Liquid volatile components were then recovered by collecting the steam flowing out from the top of the aforementioned extraction container and cooling (Brix about 1.5). Injection of the aforementioned super heated steam was discontinued when 4 liters of volatile components were obtained. The extraction time was about 8 minutes.

Next, 160 liters of an aqueous coffee extract of Brix 3.3 were obtained by water extraction of the aforementioned ground coffee beans following extraction of volatile components using hot water at 95° C. The extraction time was about 1 hour. Moreover, the total amounts of the resulting volatile components and aqueous extract were respectively mixed followed by the addition of 213 g of sodium bicarbonate and adjusting to a total volume of 425 liters using water. As a result, a coffee drink having a Brix 1.3 and pH 6.10 was prepared. After filling this coffee drink into metal cans and sealing, a canned coffee drink was produced by sterilizing for 5 minutes at 123° C.

COMPARATIVE EXAMPLE 5

After 20 kg of coffee beans having the L value 21 were ground, the ground coffee beans were charged into a sealable extraction container. After replacing the air inside the aforementioned extraction container with nitrogen gas (normal pressure), 160 liters of an aqueous coffee extract of Brix 3.3 were obtained by water extraction using hot water at 95° C. Steam extraction was not carried out in this Comparative Example 5. 213 g of sodium bicarbonate were added to the resulting aqueous extract followed by adjusting to a final volume of 425 liters using water. As a result, a coffee drink having a Brix 1.3 and pH 6.10 was obtained. A canned coffee drink was produced in the same manner as Example 8 using this coffee drink.

<Aromatic Component Evaluation Test 5>

Figure 1E:
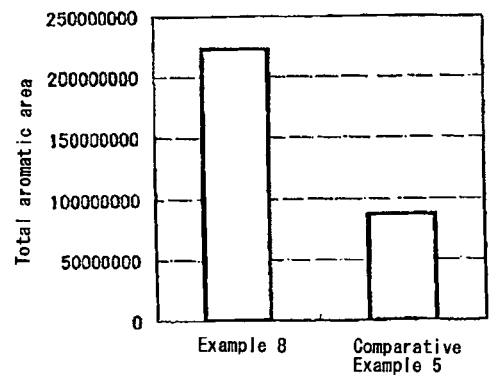
FIG. 1(e) is a graph showing the results of an aromatic component evaluation test of Example 8.

An evaluation test by GC-MS was carried out in the same manner as the aforementioned Aromatic Component Evaluation Test 1 on the canned coffee drinks of Example 8 and Comparative Example 5. Those results are shown in FIG. 1(e). As a result, the total amount of aromatic components of Example 8 was confirmed to be significantly greater than that of Comparative Example 5. Thus, the aroma of a coffee drink prepared by mixing a liquid obtained by steam extraction using super heated steam and an aqueous coffee extract was clearly demonstrated to be considerably enhanced as compared with coffee comprised only of an aqueous coffee extract even if the same amounts of coffee beans are used.

[Study of Tasty Materials]

EXAMPLE 9

5 kg of raw coffee beans (Brazil No. 2 (arabica)) were roasted using super heated steam at 350° C. As a result, coffee beans having the L value 24 were obtained. forming the aforementioned super heated steam by contacting saturated water vapor generated by a boiler with a ceramic heating element heated by electromagnetic induction heating at a frequency of 35 kHz, it was fed into a roasting oven filled with raw coffee beans. Roasting was carried out for about 10 to 12 minutes under atmospheric pressure.

COMPARATIVE EXAMPLE 6

After charging 5 kg of raw coffee beans (Brazil No. 2) into a completely hot air roaster (Fuji Royal), the coffee beans were roasted for 10 to 12 minutes using hot air heated with propane gas. As a result, coffee beans having the L value 24 were obtained.

<Accelerated Deterioration Test>

An accelerated deterioration test was carried out on the roasted coffee beans of Example 9 and Comparative Example 6 by allowing them to stand for 1 week or 2 weeks at 45° C. under atmospheric pressure. The following analytical tests were carried out on each sample following accelerated deterioration testing for 1 week or 2 weeks and on freshly roasted coffee beans (coffee beans immediately after roasting) used as a control.

(Analytical Test 1: Aroma Analysis by GC-MS)

The number of peaks for which aromatic components had not changed as compared with the freshly roasted beans used as a control was determined for coffee beans allowed to stand for 2 weeks at 45° C., followed by calculation of the ratio of those peaks to the total number of peaks. SPME was used to measure the aromatic components. Namely, each component in the ground coffee beans was adsorbed to an SPME resin for 15 minutes at 45° C. followed by placing the SPME resin in a GC-MS (HP6890 series). As a result, in contrast to 39% of the peaks remaining in Example 9, only 17% of the peaks remained in Comparative Example 6. Thus, the coffee beans roasted by super heated steam of Example 9 clearly demonstrated less changes over time in aromatic components.

(Analytical Test 2: Organic Acid Analysis and pH Measurement)

After grinding 5 g of each of the coffee beans of Example 9 and Comparative Example 6 that underwent accelerated deterioration testing after roasting, 100 mL of hot water at 95° C. were added to each, and after carrying out aqueous extraction with hot water for 5 minutes, aqueous coffee extracts were obtained by filtering with a No. 2 paper filter. Next, the content of organic acids (formic acid and acetic acid) was measured by HPLC analysis using an ion conductivity detector. In addition, the pH of each aqueous extract was measured with a pH meter. Those results are shown in Table 4.

TABLE 4

|  | Formic acid (ppm) | | Acetic acid (ppm) | | pH | |
| --- | --- | --- | --- | --- | --- | --- |
|  | Example 9 | Comp. Ex. 6 | Example 9 | Comp. Ex. 6 | Example 9 | Comp. Ex. 6 |
| Freshly roasted | 83.81 | 105.42 | 209.22 | 256.57 | 6.22 | 5.66 |
| 1 week at 45° C. | 84.83 | 108.98 | 209.22 | 254.37 | 6.35 | 5.60 |
| 2 weeks at 45° C. | 84.73 | 110.82 | — | — | 6.36 | 5.78 |

According to Table 4, the aqueous coffee extract of Example 9 was determined to have mellow and pleasant acidity since it contained lower amounts of formic acid and acetic acid than Comparative Example 6. Moreover, the coffee beans roasted with super heated steam of Example 9 were shown to suppress changes over time while maintaining the same quality as that immediately after roasting. On the basis of these results, roasting with super heated steam is able to inhibit deterioration of coffee beans over time extremely effectively. Thus, it is surmised that extremely high-quality volatile components can be easily obtained by steam extraction of tasty materials roasted using super heated steam. In addition, although the data is not shown here, when canned black coffee was produced using the aqueous coffee extracts of Example 9 and Comparative Example 6 and similar accelerated deterioration tests were carried out on that canned coffee, the canned coffee of Example 9 was confirmed to demonstrate fewer changes over time in aromatic components as well as lower amounts of organic acids formed and lower reduction rates of chlorogenic acid as compared with Comparative Example 6. When canned coffee with sweetened milk was similarly produced and the same accelerated deterioration tests were carried out, the canned coffee of Example 9 was confirmed to demonstrate less denaturation of milk proteins over time as compared with Comparative Example 6.

The invention claimed is:

1. A method of extracting volatile components applicable for a food or drink by which volatile components are obtained by super heated steam extraction of tasty materials including roasted coffee beans or tea leaves following tea manufacturing, the method comprising:
    directing super heated steam produced from deoxygenated water into contact with the tasty material including roasted coffee beans or tea leaves following tea manufacturing, wherein the directing is carried out within a sealed container under an inert gas atmosphere;
    recovering the super heated steam after said directing of said super heated steam, wherein the super heated steam extraction is carried out using the super heated steam that is set to a temperature higher than 140° C. but no higher than 500° C., wherein a steam flow rate of 0.3 to 30 kg/h is used per 1 kg of tasty material, wherein said directing of said super heated steam is carried out for 5 to 30 minutes, wherein a recovery rate of the volatile components by the super heated steam extraction is 0.01 to 10% by weight as a solid with respect to the tasty material, and wherein the super heated steam is used at normal pressure;
    obtaining an aqueous extract by water extraction of the tasty material following the super heated steam extraction; and
    mixing the aqueous extract and the volatile components.

2. The method of extracting volatile components according to claim 1, wherein the tasty material includes roasted coffee beans.

3. The method of extracting volatile components according to claim 2, wherein the coffee beans are at least one type selected from the group consisting of *Coffea arabica, C. canephora* var. *robusta, C. canephora* var. *conulon* and *C. liberica*.

4. The method of extracting volatile components according to claim 2, wherein the roasted coffee beans are obtained by roasting raw coffee beans using a roasting super heated steam.

5. The method of extracting volatile components according to claim 4, wherein the roasting super heated steam used to roast the raw coffee beans is set to a temperature higher than 107° C. but no higher than 500° C.

6. The method of extracting volatile components according to claim 4, wherein the roasting super heated steam used to roast the raw coffee beans is set to a temperature higher than 140° C. but no higher than 500° C.

7. The method of extracting volatile components according to claim 4, wherein the raw coffee beans are roasted using the roasting super heated steam at 1 to 30 kg/h per 1 kg of the raw coffee beans.

8. The method of extracting volatile components according to claim 2, wherein the roasted coffee beans are obtained by roasting raw coffee beans using at least one type of method selected from the group consisting of far infrared roasting, hot air roasting, direct flame roasting and charcoal roasting.

9. The method of extracting volatile components according to claim 2, wherein the L value of the roasted coffee beans is 15 to 33.

10. The method of extracting volatile components according to claim 1, wherein the tea leaves are at least one type selected from the group consisting of green tea, oolong tea, black tea, barley tea, adlay tea, jasmine tea, Pu-Erh tea, rooibos tea and herb tea.

11. The method of extracting volatile components according to claim 1, further comprising cooling the steam after said directing said super heated steam into contacting the tasty material.

12. The method of extracting volatile components according to claim 1, further comprising drying the steam by freeze-drying or spray-drying after said directing said super heated steam into contact with the tasty material.

13. The method according to claim 1, wherein the food or drink is a coffee drink, tea drink, concentrated extract for a dispenser, instant coffee or instant tea.

* * * * *